Figure 1:
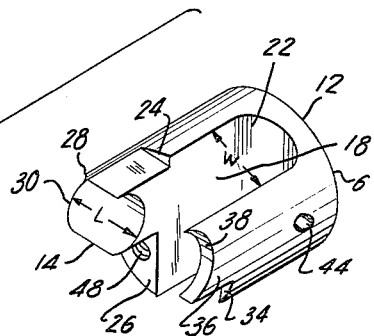

July 2, 1963   T. CANTOR   3,096,110
CLAMP
Filed Jan. 7, 1963

INVENTOR.
THEODORE CANTOR

BY

ALAN K. ROBERTS
ATTORNEY 3,096,110
CLAMP
Theodore Cantor, Yonkers, N.Y., assignor to Manostat Corporation, New York, N.Y.
Filed Jan. 7, 1963, Ser. No. 249,891
9 Claims. (Cl. 287—54)

This invention relates to clamp structures and, more particularly, to clamps adapted for use in connection with frame assemblies.

It is an object of the invention to provide an improved clamping structure.

It is a further object of the invention to provide an improved clamp consisting of two substantially identical parts adapted for being manufactured with mass production techniques.

It is a further object of the invention to provide substantially identical clamping elements which, when held together in mating engagement, provide two spaced circular passages or the like arranged at right angles to one another.

Still another object of the invention is to provide improved clamping elements which are readily held together in mating engagement.

In achieving the above and other of its objectives, the invention contemplates the provision of a clamp consisting of first and second elements adapted for being connected in mating engagement. Each of the aforesaid elements comprises a generally cylindrical body having opposite ends and provided with an axially extending elongated slot of determinable width which opens at one of these ends and which terminates in a semi-circular extremity remote from this end. The body, moreover, includes branches on opposite sides of the slot, the branches being of a width equal to the aforesaid width and including free end portions having semi-circular profiles of the same diameter as the aforesaid semi-circular extremity.

In further accordance with the preferred embodiment of the invention, the aforenoted body includes first and second shoulders on opposite sides of one of the above noted branches and at one side of the associated slot and a single further shoulder on one side of the other of the branches on the other side of the said slot.

The branches of each body are accommodate in the slot of the other body with the shoulders of the respective bodies in an abutting relationship so that the semi-circular profiles and extremities define perpendicularly aligned circular passages spaced from one another.

In further accordance with the preferred embodiment of the invention, one of the elements is provided with an axially extending bore passing completely therethrough, whereas the other of the elements is provided with a threaded bore aligned with the first said bore so that a threaded bolt can be employed to hold these elements together.

As will be noted from the description which follows, the elements of the invention are very readily combined and may be manufactured at a comparatively low cost.

Figure 2:
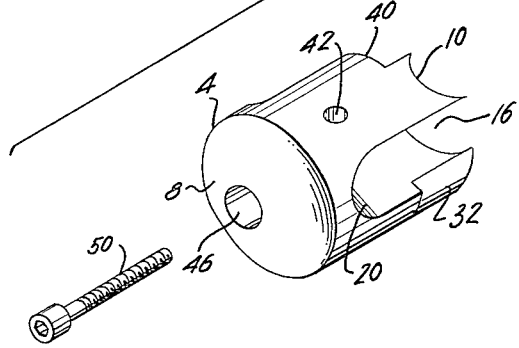
Figure 2:
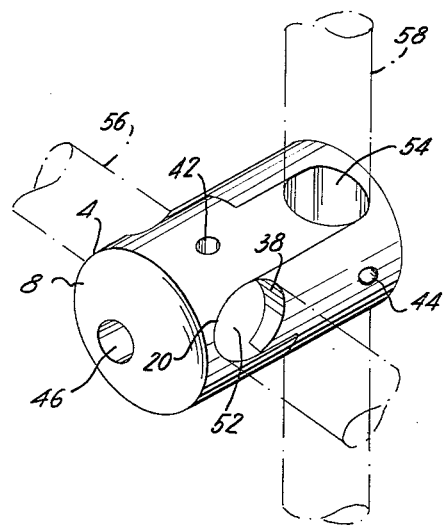

Other objects, features and advantages of the invention will be found in the following detailed description of a preferred embodiment as illustrated in the accompanying drawing in which:

FIGURE 1 is an exploded view of a clamp provided in accordance with the invention; and FIGURE 2 illustrates the clamping elements assembled, with rods accommodated therein being shown in phantom.

The illustrated clamping apparatus includes first and second elements consisting of generally cylindrical bodies 4 annd 6, the body 4 having an end 8 and an end 10 and the body 6 having an end 12 and an end 14.

The body 4 is provided with an axially extending slot 16, whereas the body 6 is provided with an axially extending slot 18.

The slot 16 opens at the end 10 and terminates remotely of said end in a semi-circular extremity 20. The slot 18 opens at the end 14 of body 6 and terminates remotely of said end in a semi-circular extremity 22. The slots 16 and 18 are of a predetermined width W which is equal to the diameters of semi-circular extremities 20 and 22.

The body 6 is provided with first and second shoulders 24 and 26 on opposite sides of the branch 28 of the body 6, which branch is positioned to one side of the slot 18. Branch 28 terminates in a semi-circular profile 30 which is of the same diameter as semi-circular extremities 20 and 22. Body 8 is also provided with two shoulders of which only the shoulder 32 is visible in FIG. 1.

Body 6 includes a shoulder 34 which is the sole shoulder adjacent branch 36 on the side of slot 18 opposite that occupied by branch 28. Branch 36 terminates in a semi-circular profile 38 which is coaxial with profile 30 and which is of the same diameter as profile 30. Body 8 has a shoulder 40 corresponding to the shoulder 34 of body 6.

Branches 28 and 36 of body 6 have a width which is equal to width W of the aforesaid slots. The branches of body 8 are of the same width. As a matter of fact, the bodies 6 and 8 heretofore described are identical to each other in the characteristic dimensions which have been thus far mentioned.

Body 8 is provided with a radially extending opening 42, the body 6 being provided with a corresponding opening 44. The purposes of these openings will become hereinafter apparent.

Bodies 6 and 8 are different solely with regard to the openings 46 and 48 provided therein. Whereas the opening 46 is a smooth bore extending axially completely through the body 8, the opening 48 is a threaded bore which need extend only partially through the body 6.

The purpose of openings 46 and 48 is to accommodate a threaded bolt 50 which passes completely through the body 8 and threadably engages in opening 48 to lock the bodies 6 and 8 together in mating engagement as illustrated in FIG. 2.

In FIG. 2 it is seen that, for example, semi-circular extremity 20 and semi-circular profile 38 cooperate to define a circular passage 52, whereas a semi-circular passage 54 perpendicularly disposed relative to passage 52 is spaced from the latter. In said passages are respectively accommodated rods 56 and 58 which may constitute parts of a frame not shown in entirety. To lock said rods in position, set screws (not shown) are provided in openings 42 and 44.

It will be noted that one of the two branches of each body is provided with a thickness L which is substantially greater than the thickness of the other branch. This means that the larger thickness provides a bearing surface whereas the other branch is a positioning member, the rod bearing in entirety against the bottom of the slot of the cooperating member.

It will now appear that a very simple and economical clamping structure has been provided which is readily adapted to mass production techniques.

There will now be obvious to those skilled in the art many modifications and variations of the structure set forth above. These modifications and variations will not, however, depart from the scope of the invention if defined by the following claims.

What is claimed is:

1. Apparatus comprising first and second elements adapted for being connected in mating engagement, each said element comprising a body having opposite ends and being provided with an axially extending elongated slot of determinable width opening at one of said ends and terminating in a semi-circular extremity remote from said one end, said body including branches on opposite sides of said slot, said branches being of said width and including free end portions at said one end, said free end portions having semi-circular profiles of the same diameter as the semi-circular extremity, said body including shoulders adjacent said branches, the branches of each body being accommodated in the slot of the other body with the shoulders of the respective bodies in abutting relation whereby the semi-circular profiles and extremities define circular passages spaced from one another.

2. A clamp comprising first and second elements in mating engagement, each said element comprising a body having opposite ends and being provided with an axially extending elongated slot of determinable width opening at one of said ends and terminating in a semi-circular extremity remote from said one end, said body including branches on opposite sides of said slot, said branches being of said width and including free end portions at said one end, said free end portions having coaxial semi-circular profiles of the same diameter as the semi-circular extremity, said body including shoulders adjacent at least one of said branches, the branches of each body being accommodated in the slot of the other body with the shoulders of the respective bodies in abutting relation whereby the semi-circular profiles and extremities define perpendicularly aligned circular passages spaced from one another, and a threaded means to hold said elements together.

3. A clamp comprising first and second elements in mating engagement, each said element comprising a body having opposite ends and being provided with an axially extending elongated slot of determinable width opening at one of said ends and terminating in an arcuate extremity remote from said one body, said body including branches on opposite sides of said slot, said branches being of said width and including free end portions at said one end, said free end portions having arcuate profiles, said body including first and second shoulders on opposite sides of one of said branches at one side of said slot and a single further shoulder on one side of the other of said branches on the other side of said slot, the branches of each body being accommodated in the slot of the other body with the shoulders of the respective bodies in abutting relation whereby the profiles and extremities define perpendicularly aligned passages spaced from one another, and means to hold said elements together.

4. A clamp comprising a pair of elements in mating engagement, each said element comprising a generally cylindrical body having opposite ends and being provided with an axially extending elongated slot of determinable width opening at one of said ends and terminating in a semi-circular extremity remote from said one end, said body including branches on opposite sides of said slot, said branches being of said width and including free end portions at said one end, said free end portions having coaxial semi-circular profiles of the same diameter as the semi-circular extremity, said body including first and second shoulders on opposite sides of one of said branches at one side of said slot and a single further shoulder on one side of the other of said branches on the other side of said slot, said one branch having a substantially greater thickness than the said other branch, the branches of each body being accommodated in the slot of the other body with the shoulders of the respective bodies in abutting relation whereby the semi-circular profiles and extremities define perpendicularly aligned circular passages spaced from one another, and means to hold said elements together.

5. A clamp comprising first and second elements in mating engagement, each said element comprising a generally cylindrical body having opposite ends and being provided with an axially extending elongated slot of determinable width opening at one of said ends and terminating in a semi-circular extremity remote from said one end, said body including branches on opposite sides of said slot, said branches being of said width and including free end portions at said one end, said free end portions having coaxial semi-circular profiles of the same diameter as the semi-circular extremity, said body including first and second shoulders on opposite sides of one of said branches at one side of said slot and a single further shoulder on one side of the other of said branches on the other side of said slot, the branches of each body being accommodated in the slot of the other body with the shoulders of the respective bodies in abutting relation whereby the semi-circular profiles and extremities define perpendicularly aligned circular passages spaced from one another, and means to hold said elements together.

6. A clamp element comprising a generally cylindrical body having opposite ends and being provided with an axially extending elongated slot of determinable width opening at one of said ends and terminating in a semi-circular extremity remote from said one end, said body including branches on opposite sides of said slot, said branches being of said width and including free end portions at said one end, said free end portions having coaxial semi-circular profiles of the same diameter as the semi-circular extremity, said body including first and second shoulders on opposite sides of one of said branches at one side of said slot and a single further shoulder on one side of the other of said branches on the other side of said slot, said body being provided with an axially aligned threaded bore.

7. A clamp element comprising a generally cylindrical body having opposite ends and being provided with an axially extending elongated slot of determinable width opening at one of said ends and terminating in a semi-circular extremity remote from said one end, said body including branches on opposite sides of said slot, said branches being of said width and including free end portions at said one end, said free end portions having coaxial semi-circular profiles of the same diameter as the semi-circular extremity, said body including first and second shoulders on opposite sides of one of said branches at one side of said slot and a single further shoulder on one side of the other of said branches on the other side of said slot, said body being provided with an axially extending bore passing completely therethrough.

8. A clamp comprising first and second elements in mating engagement, each said element comprising a generally cylindrical body having opposite ends and being provided with an axially extending elongated slot of determinable width opening at one of said ends and terminating on a semi-circular extremity remote from said one end, said body including branches on opposite sides of said slot, said branches being of said width and including free end portions at said one end, said free end portions having coaxial semi-circular profiles of the same diameter as the semi-circular extremity, said body including first and second shoulders on opposite sides of one of said branches at one side of said slot and a single further shoulder on one side of the other of said branches on the other side of said slot, the branches of each body being accommodated in the slot of the other body with the shoulders of the respective bodies in abutting relation whereby the semi-circular profiles and extremities define perpendicularly aligned circular passages spaced from one another, one of said elements being provided with an axially extending bore passing completely therethrough and the other of said elements being provided with a threaded bore aligned with the first said bore, and a threaded bolt engaged in said bore to hold said elements together.

9. A clamp comprising first and second elements in mating engagement, each said element comprising a generally cylindrical body having opposite ends and being provided with an axially extending elongated slot of determinable width opening at one of said ends and terminating on a semi-circular extremity remote from said one end, said body including branches on opposite sides of said slot, said branches being of said width and including free end portions at said one end, said free end portions having coaxial semi-circular profiles of the same diameter as the semi-circular extremity, said body including first and second shoulders on opposite sides of one of said branches at one side of said slot and a single further shoulder on one side of the other of said branches on the other side of said slot, the branches of each body being accommodated in the slot of the other body with the shoulder of the respective bodies in abutting relation whereby the semi-circular profiles and extremities define perpendicularly aligned circular passages spaced from one another, one of said elements being provided with an axially extending bore passing completely therethrough and the other of said elements being provided with a threaded bore aligned with the first said bore, a threaded bolt engaged in said bore to hold said elements togther, and means to engage rods accomomdated in said circular passages.

References Cited in the file of this patent

UNITED STATES PATENTS

| | | |
|---|---|---|
| 1,950,635 | Steinmayer | June 5, 1930 |
| 2,942,899 | Rifken | June 28, 1960 |